United States Patent [19]
Frederick

[11] 3,839,965
[45] Oct. 8, 1974

[54] TURNTABLE

[75] Inventor: Arthur I. Frederick, Webster Grove, Mo.

[73] Assignee: The Pandjiris Weldment Co., St. Louis, Mo.

[22] Filed: Apr. 28, 1972

[21] Appl. No.: 248,364

[52] U.S. Cl. ............................................. 104/35
[51] Int. Cl. ........................................... B60s 13/02
[58] Field of Search .................... 104/35, 36, 37–47, 104/99, 75; 105/373

[56] References Cited
UNITED STATES PATENTS

| | | | |
|---|---|---|---|
| 754,530 | 3/1904 | Zilker et al. | 104/45 |
| 3,078,522 | 2/1963 | Anderson | 104/44 |
| 3,728,971 | 4/1973 | Merrick | 104/44 |

*Primary Examiner*—M. Henson Wood, Jr.
*Assistant Examiner*—Richard A. Bertsch

[57] ABSTRACT

This turntable assembly includes a rotating carriage having depending wheel assemblies transferring load from the carriage to a circular track at three spaced points about the track, the carriage being rotated by a drive assembly connected to one of the wheel assemblies. The circular track includes an inclined bearing surface and the carriage wheels rotatable thereon are compatibly inclined so that the carriage is substantially self-centered on the base assembly, and a pin and socket guidance assembly is provided between the carriage and the base frame to locate the carriage on the frame. The base frame is mounted for fore and aft movement on a linear track assembly.

3 Claims, 4 Drawing Figures

TURNTABLE

BACKGROUND OF THE INVENTION

This invention relates generally to turntable assemblies for rotating large workpieces and particularly to a turntable having an improved load transfer system.

Turntables have been used for many years to provide a means of rotating large workpieces so that the various parts are rendered more readily accessible to an operator, such as a welding technician.

One of the problems inherent in any large turntable assembly is the construction of a wheel assembly system which transfers load to the base system as evenly as possible so that the structure turns easily. In the past multiple roller bearings have frequently been used for this purpose. Obviously, the use of multiple load transfer bearings requires a high degree of accuracy between engagement surfaces to ensure that all of the roller bearings are in engagement.

Another problem lies in providing suitable locating and aligning means between the carriage and the base. A common practice is to provide turntables with a central drive system rotating the carriage, and use the drive system, in effect, to center and align the carriage on the base. The disadvantage of this is that severe lateral strain can be experienced by the drive system with this arrangement.

Ideally, turntables should be constructed in such a manner that the workpiece is easily accessible. Unfortunately, because of the limitations imposed by the structural arrangement of the load transfer system and the drive system this has been difficult to achieve in the past.

The present turntable assembly overcomes the disadvantages outlined above in a manner not heretofore accomplished by known prior turntable assemblies.

SUMMARY OF THE INVENTION

This turntable assembly includes a rotatable carriage mounted to a base frame by a three-point wheel transfer system which ensures that each wheel carries a proportional part of the load.

The drive system is offset relative to the center of the carriage and connected to one of the three wheels rather than to a central drive shaft. A pin and socket assembly between the carriage and the base frame provides a location and alignment means independent of the drive system. The carriage wheels and the circular track engaged by said wheels are inclined so that the carriage load transferred to the track tends to align the carriage automatically and thereby avoid unnecessary strain on the pin and socket assembly.

The carriage is formed from a substantially open framed structure and includes three arms extending beyond the load transfer wheels to ensure even distribution of carriage load to the track. The open frame provides ease of access to supported workpieces.

The base frame supporting the carriage is mounted on a linear track to provide the turntable assembly with a fore and aft movement capability as well as rotational movement capability.

This turntable assembly includes a base means, having a circular track disposed about a track center, and a rotatable carriage means, having three bearing wheels engageable with the track. Alignment means between the carriage means and the base means aligns the carriage means about the track center and drive means, offset from the track center, is connected to one of the bearing wheels to rotate the carriage means about the track. The base means is mounted on a linear track to provide the turntable assembly with translational movement.

The carriage means is formed from a substantially Y-shaped frame having a center portion and three outwardly extending arms, each arm having a wheel depending therefrom, the three wheels substantially transferring all of the load from the carriage means to the circular track. The alignment means includes a pin and socket between the carriage means and the base means, one of said elements being attached to the carriage means and the other to the base means. The circular track includes a frusto-conical bearing surface and each of the three wheels includes a compatible bearing surface transferring carriage load to the track.

The center portion of the carriage means is hexagonal in configuration and the arms extend outwardly from alternate sides thereof at 120° to each other. The arms extend outwardly beyond the track center and overhang the track by an amount equal to at least 25 percent of the radius of the circular track.

Figure 1:
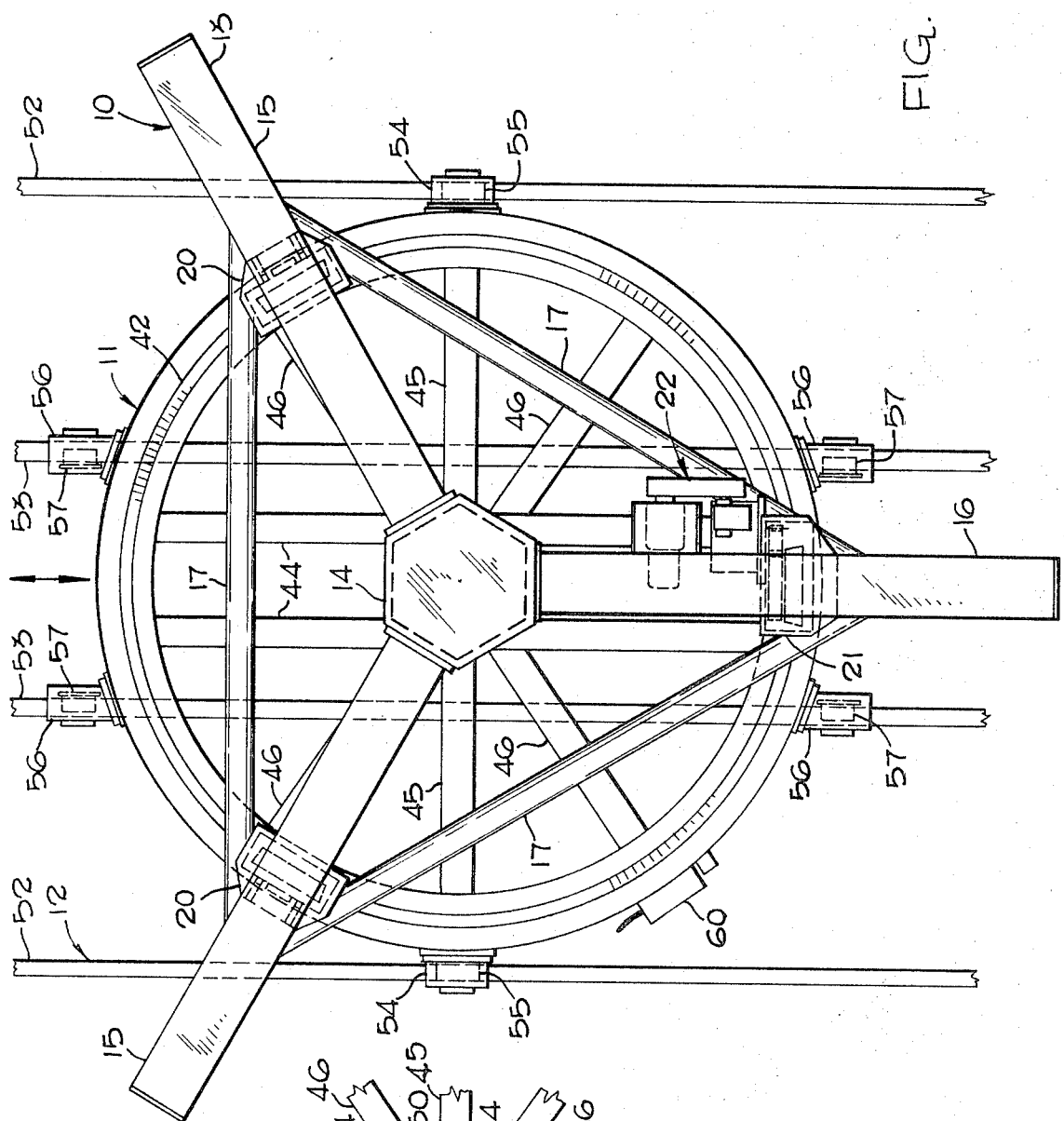
FIG. 1 is a plan view of the turntable assembly.
Figure 2:
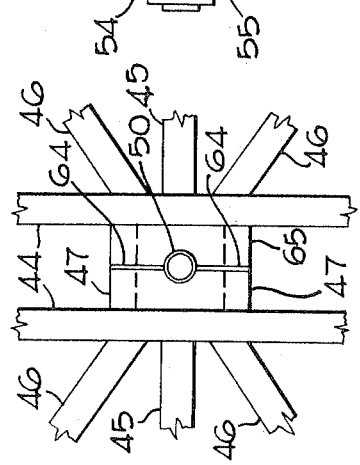
FIG. 2 is a fragmentary plan view of the center of the base frame.

DESCRIPTION OF THE PREFERRED EMBODIMENT:

Referring now by characters of reference to the drawings and first to FIGS. 1 and 2 it will be understood that the turntable assembly includes a carriage, generally indicated by numeral 10, and rotatably mounted on a base frame 11. The base frame 11 is mounted on a linear track assembly indicated by numeral 12 which provides the turntable assembly as a whole with translational as well as rotational movement.

The carriage 10 includes a substantially horizontal frame 13, having a center portion 14 and three arms extending outwardly from the center portion 14 in a Y-configuration. Two arms are indicated by numeral 15 and a third arm by numeral 16. The horizontal frame center portion 14 is generally hexagonal in shape and provides a housing, to which the arms 15 and 16, formed from box girders, are attached as by welding. The arms 15 and 16 are braced by a triangular formation of tubular braces 17 extending between said arms, and, in the preferred embodiment the angle between each pair of arms is 120°.

The carriage includes three depending wheel assemblies 20 and 21 attached to arms 15 and 16 respectively. Wheel assembly 21 is similar to wheel assemblies 20 except that it is adapted to be connected to a drive assembly, generally indicated by numeral 22.

Figure 3:
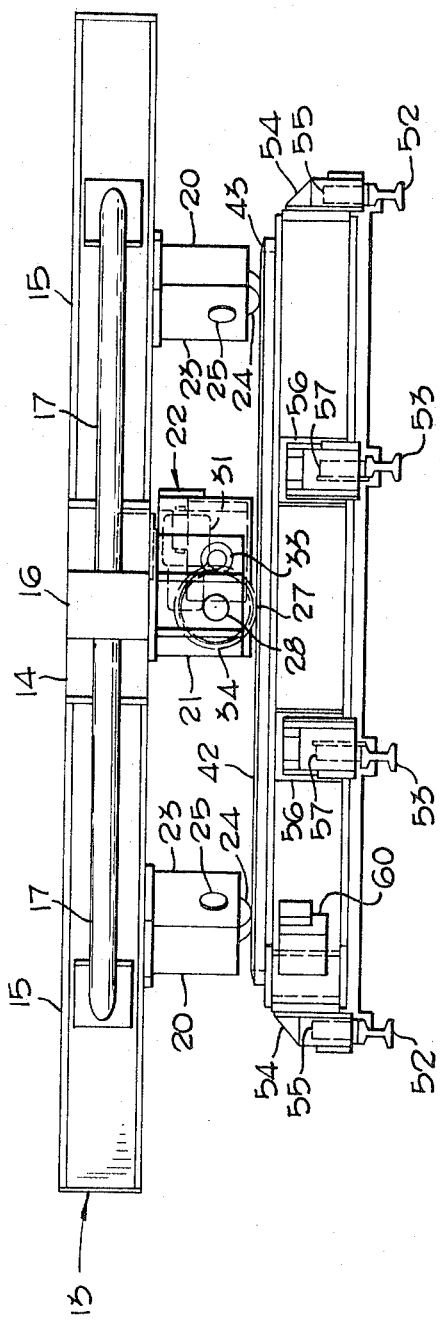
FIG. 3 is an end view of the turntable assembly.
Figure 4:
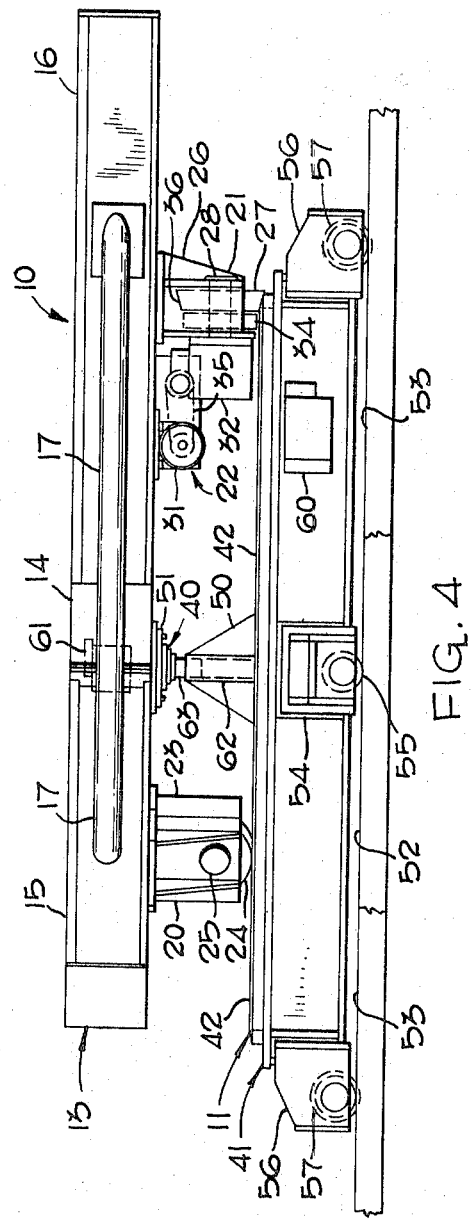
FIG. 4 is a side view of the turntable assembly.

Each wheel assembly 20 comprises essentially a housing 23, attached to the underside of an associated arm 15 and a wheel 24, rotatively mounted to the housing 23 by means of a shaft 25. Wheel assembly 21, which depends from arm 16, includes a housing 26 and a wheel 27 rotatively mounted to the housing by means of a shaft 28. As shown in FIGS. 3 and 4 wheel assembly 21 is adapted to be connected to the drive assembly 22, which includes a motor 31 mounted to the underside of arm 16 and connected to a transmission 32 mounted to the wheel assembly 21. The transmission includes a drive gear 33, which rotates the wheel 27, through the medium of a driven gear 34 directly attached to the rear of the wheel 27. It will be understood that the motor 31 and the transmission 32 are interconnected in driving relation by means of a flexible drive generally indicated by numeral 35.

The carriage 10 is located relative to the base frame 11 by means of a pin and socket assembly, constituting an alignment means and generally indicated by numeral 40 in FIG. 4. Wheels 24 and 27 include inclined bearing faces 36 also for alignment purposes as will be described later.

As shown in FIG. 1 the base frame 11 includes a circular box girder member 41, providing seating for a circular track 42 and, as shown in FIGS. 3 and 4, track 42 is provided with a bearing face 43 compatibly inclined with the bearing faces of the carriage wheels 24 and 27. The circular member 41 is internally braced by means of a pair of parallel bracing members 44, opposed cross bracing members 45 and diagonal bracing members 46, and a pair of struts 47 extends between parallel bracing members 44 all as shown in FIGS. 1 and 2. Struts 47 provide a seat for the lower, socket portion of the pin and socket assembly 40, which is indicated by numeral 50 and is rigidly secured, as by bolting, to said struts 47. The upper pin portion 51 is secured to the carriage center portion 14, as by bolting, as indicated in FIG. 4.

The base frame 11 is provided with spaced inner and outer wheel assemblies, attached to the circular member 41, by which said frame is mounted to track assembly 12 consisting of outer and inner tracks 52 and 53 respectively. The outer wheel assemblies 54 include plain wheels 55 engageable with outer tracks 52. The inner wheel assemblies 56 include flanged wheels 57 engageable with inner tracks 53 to substantially preclude transverse movement of the base frame 11 relative to the direction of travel.

In the preferred embodiment incoming electric power to the drive assembly 22, which is required to turn the carriage 10, is supplied to a starter and transformer assembly indicated by numeral 60, which is mounted to the base frame 11. The drive assembly includes a slip ring 61 housed within the carriage center portion as indicated in FIG. 4. The slip ring 61 transfers power from the transformer and starter assembly 60 to the drive assembly 22 by means of a cable system (not shown).

The carriage 10 includes only three wheel assemblies and therefore any load applied to the turntable horizontal frame 13 from a workpiece carried thereon is carried entirely by the three wheels and transferred to the circular track 42. The Y-shaped configuration of the frame 13 provides that the weight of the carriage 10 is shared substantially equally between each wheel assembly, in the preferred embodiment, because the Y-shaped configuration is formed with angles of 120° between each of the arms 15 and 16 to ensure optimum load distribution. Further, the nature of a three-point, load transfer system ensures that all of the wheels are in bearing engagement at all times. The direction of inclination of the bearing face 43 of the circular track 42 is substantially frustoconical which ensures that the wheel assemblies tend to be urged outwardly so that the carriage 10 is substantially self-aligned on the base frame 11.

The lower portion 50 of the post and socket assembly 40 includes a hollow post 62 which provides a socket. The rotatable upper portion 51 includes a hollow depending shaft 63 providing a pin receivable by said post 62. In effect, the pin and socket assembly 40 constitutes a locating and alignment means. However, the interfitting parts are not subjected to any severe shear loads under normal operation because such shear loads are taken by the bearing engagement between the wheels 24 and 27 and the circular track 42.

It is thought that the structural features and functional advantages of this turntable assembly have become fully apparent from the foregoing description of parts but for completeness of disclosure the operation of the device will be briefly summarized.

The load capacity of the turntable in a preferred embodiment having a track diameter of about 14 feet can be as high as 150 tons. The arms 15 and 16 extend about 5 feet beyond the track, more than 25 percent of the track radius, and thus provide potential support for a large workpiece on either side of the load transfer points. The result of this structural arrangement is that large loads tend to be transferred evenly to the circular track through the medium of the wheels and the system as a whole is substantially evenly balanced. The rotational speed of the carriage has been found to be satisfactory at about one quarter of a revolution per minute for a load capacity of 150 tons.

In addition to the rotational capability of the carriage 10 the provision of the linear track assembly 12 permits the turntable assembly as a whole to be moved in a fore and aft direction. When the device is adapted to suit large loads the provision of four tracks is desirable so that the weight of the loaded turntable assembly is distributed substantially evenly to each wheel. It will be understood that the weight distribution is facilitated by providing more inner wheels than outer wheels and that the axes of rotation of said inner and outer wheels are substantially parallel.

The post and socket assembly 40 provides a locating and aligning means which facilitates the initial mounting of the carriage 10 on the base frame 11 and provides a positive safety connection in the event that carriage 10 is inadvertently moved from the self-aligned location on the inclined bearing face of the circular track 42.

I claim as my invention:

1. In a turntable assembly:
    a. base means including a circular track disposed about a track center,
    b. carriage means rotatively mounted to the track and including three bearing wheels engageable with the track,
    c. alignment means between the base means and the carriage means aligning the carriage means relative to the base means so that the axis of rotation of the carriage means and the track center are substantially coincident, the alignment means including:
        1. an upper inclined bearing surface on the track sloping downwardly in a direction radially outwardly of the track center, and
        2. peripheral load bearing surfaces on each wheel compatibly inclined to engage the inclined bearing surface of the track, the wheels tending to be urged outwardly in a direction radially of the track center for alignment of the base means and carriage means, d. drive means operatively connected to one of said wheels to rotate said carriage means about the track center.

2. A turntable assembly as defined in claim 1, in which:

e. the alignment means includes interfitting vertical pin means and socket means to facilitate initial mounting of the carriage means on the base means, one of said means being attached to the carriage means and the other of said means being attached to the base means, the bearing engagement of the inclined load bearing surfaces on the track and wheels preventing severe shear load from the pin and socket means.

3. In a turntable assembly:

a. base means including a circular track disposed about a track center, b. carriage means including:
  1. a substantially Y-shaped frame having a center portion and three outwardly extending arms, disposed at substantially equal angular relation to each other, and
  2. wheel assembly means depending from each arm and transferring substantially all of the carriage load in substantially equal portions from the carriage means to the track, c. alignment means between the base means and the carriage means include pin means carried by one of said latter two means and interfitting socket means carried by the other of said latter two means, the pin and socket means facilitating initial mounting of the carriage means on the base means, d. drive means operatively connected to one of said wheel assembly means to rotate the carriage means, and e. the circular track including an upper bearing surface sloping downwardly in a direction radially outwardly of the track center, and each of the wheel assembly means including a wheel having a compatibly inclined peripheral, load bearing surface transferring carriage load to the track and tending to urge said wheels outwardly of the track center to prevent severe shear load from the pin and socket means.

* * * * *